No. 691,320. Patented Jan. 14, 1902.
H. MOON.
CLUTCH.
(Application filed May 14, 1901.)
(No Model.)
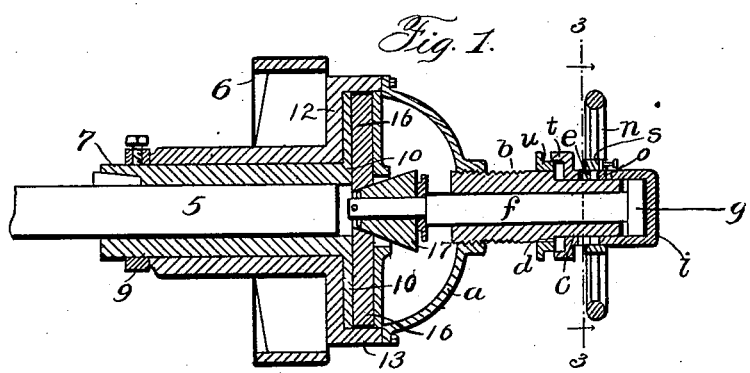
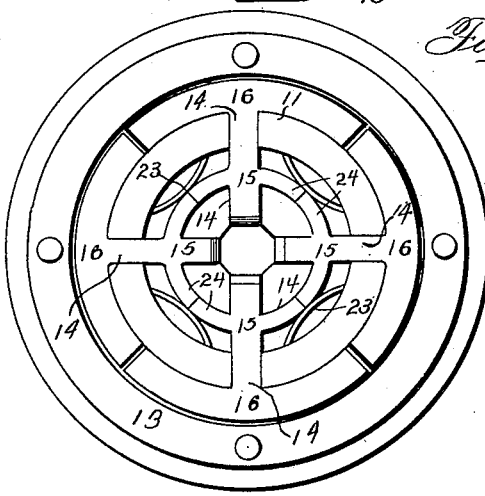
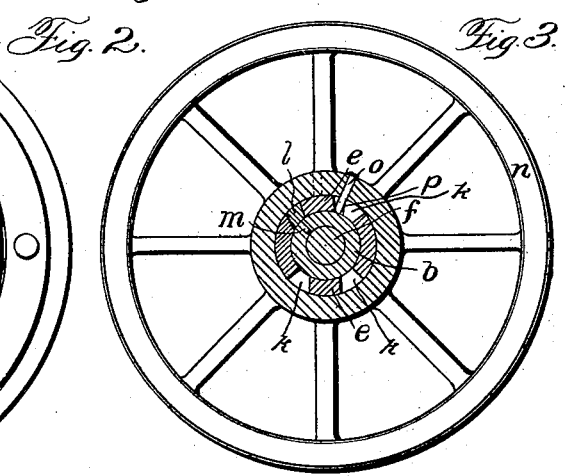
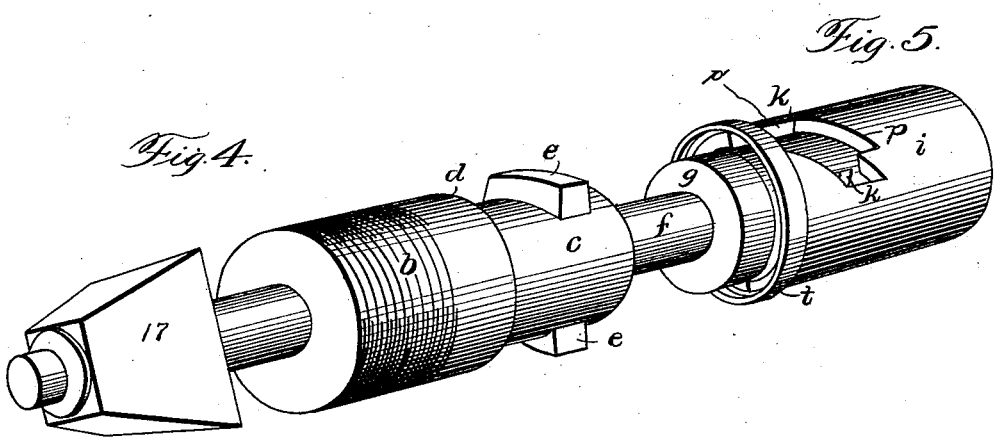
Witnesses
Frank G. Campbell
J. W. Garner
Herman Moon Inventor,
By C. A. Snow & Co.
Attorneys.

UNITED STATES PATENT OFFICE.

HERMAN MOON, OF GROVE CITY, PENNSYLVANIA, ASSIGNOR TO HENRY B. McKINNEY, FRED K. SQUIER, WILLIAM W. VAN EMAN, AND C. W. FORREST, OF GROVE CITY, PENNSYLVANIA.

CLUTCH.

SPECIFICATION forming part of Letters Patent No. 691,320, dated January 14, 1902.

Application filed May 14, 1901. Serial No. 60,189. (No model.)

*To all whom it may concern:*

Be it known that I, HERMAN MOON, a citizen of the United States, residing at Grove City, in the county of Mercer and State of Pennsylvania, have invented a new and useful Clutch, of which the following is a specification.

My invention is an improved friction-clutch for clutching a normally idle pulley to a revoluble shaft when it is desired to cause the pulley to rotate with the shaft; and it consists in the peculiar construction and combination of devices hereinafter fully set forth and claimed.

In the accompanying drawings, Figure 1 is a vertical longitudinal sectional view of my improved clutch. Fig. 2 is an end elevation of the clutch proper, with the face-plate removed to show the relative arrangement of the engaging members. Fig. 3 is a sectional view taken on a plane indicated by the line 3 3. Fig. 4 is a detail perspective view of the operating wedge and the sleeve in which it operates. Fig. 5 is a similar view of the tubular cap which coacts with the sleeve and the operating wedge and to which the hand-wheel is secured, the latter being omitted.

To the power-shaft 5 is keyed a sleeve 7, on which is loosely mounted an idler or pulley 6. The pulley is held from displacement longitudinally on the sleeve in one direction by means of a collar 9, which is removably mounted upon the sleeve. At the opposite end of the sleeve 7 is formed a web 10, which is disk-shaped, and from the outer face of which projects an annular flange 11, the functions of which will be presently explained. At that end of the hub of the pulley 6 adjacent to the web 10 and between said web and the rim of the pulley is formed a disk-shaped web 12, which lies against the rear face of web 10 and is provided with an annular flange 13 on its outer face, which flange encircles the flange 11 of disk 10 and projects slightly beyond it.

The inner face of flange 13 forms one clutch-face, the opposing clutch-faces being upon members movably mounted in the flange 11. The flange 11 is provided with four equidistant radial slots 14, and in these slots are slidably disposed the stems 15 of segmental clutch members 16, said members 16 lying between the adjacent flanges 11 and 13. Thus if the inner ends of the stems 15 be engaged to cause them to move outwardly the clutch-faces of the movable members will be brought into frictional engagement with the inner face of flange 11 and the pulley will be frictionally held to rotate with the sleeve 7. To effect this longitudinal movement of the stems 15, the inner ends thereof are beveled on their outer faces for engagement by a wedge 17, which has four converging faces. When the said wedge is moved inward by the means presently described and which constitute my present improvements, the clutch members 16 are moved radially outward and caused to clutch and lock the pulley to the shaft, as will be understood. When the clutch members 16 are released by the outward movement of the wedge 17, they are moved inward by means of springs 23, which are disposed with their ends against the inner faces of the segmental sections of flanges 11, the central portions of the springs resting against blocks 24 upon the inner ends of the stems 15 of the clutch members 16.

A head $a$, which may be either of the form here shown or any other suitable form, has a threaded opening in which is screwed the inner end of a sleeve $b$. The outer end of said sleeve is reduced, as at $c$, to form a shoulder $d$, and the reduced portion $c$ is provided on opposite sides with obliquely-disposed or screw cams $e$. The wedge 17 is keyed on the inner end of a longitudinally-movable shaft $f$, which has its bearing in the tubular sleeve $b$ and is provided at its outer end with an enlarged circular head $g$, that bears against the outer end of the sleeve $b$.

A tubular cap $i$ is fitted on the reduced outer portion $c$ of tubular sleeve $b$ and incloses the head $g$ and the outer end of the shaft $f$ and bears against the outer side of the head $g$. Said tubular cap is provided with bayonet-cam slots $k$, which coact with the screw-cams $e$ on the sleeve $b$. When the tubular cap $i$ has been placed on the sleeve $b$ and its slots $k$ have been engaged by the screw-cams $e$, a removable block $l$ is placed in one of the said slots $k$ at the end of one of the screw-cams $e$ and secured to the sleeve $b$ by a pin $m$, as shown in Fig. 3. Hence the cap is locked on the reduced portion $c$ of tubular sleeve $b$ and is permitted to be partly turned thereon independently of the sleeve and to rotate the latter and move the same lengthwise to cause the coacting screw-cams $e$ and slots $k$ to move the shaft $f$, and hence the wedge 17, inward or outward to clutch or unclutch the idler, as will be understood.

In order to adapt the cap $i$ to be readily turned to thus operate the sleeve $b$, shaft $f$, and wedge 17, I provide a hand-wheel $n$, the hub of which is fitted on the cap $i$ by a pin or stud which projects inwardly from the hub of the wheel and operates in one of the bayonet-slots $k$, which has a long spiral arm $p$ and a shorter arm $p'$, that communicates therewith at one end thereof and is at nearly a right angle with relation thereto. Hence said pin or stud may readily pass from one of said slot-arms to the other by partly turning said wheel. When said pin or stud is in the long spiral arm $p$ of said slot, said hand-wheel has lost motion on said cap; but when said pin or stud is in the arm $p'$ of said slot, which arm is parallel with the axis of the cap, said wheel can only turn with the latter, but may be moved laterally inwardly toward the pulley a slight distance or outwardly therefrom. At the inner end of the cap $i$ is an annular flange $t$, which coöperates with a flange $u$ on the tubular sleeve $b$ to form a boxing around that portion of the reduced end $c$ of the said tubular sleeve $b$ between the inner end of said cap and the shoulder $d$.

The operation of my improved clutch is as follows: When unclutched, the pulley is idle, the shaft 5 and the fast member of the clutch being in rotation. The wedge 17, being keyed on the shaft $f$, rotates the latter with said fast member while the head $a$, sleeve $b$, cap $i$, and hand-wheel $n$ are at rest. To clutch the pulley, the hand-wheel is turned, its pin or stud moving in long arm of the bayonet-slot in the cap $i$, thereby turning the latter, the slots $k$ and cam-screws $e$ coacting to also turn the sleeve $b$. The initial movement of the cap $i$ inward correspondingly moves the shaft $f$ and wedge 17, the latter serving to move the clutch members 16 outward into engagement with the pulley, thereby starting the latter in rotation, and the centrifugal force generated in the wheel $n$ causing the screw-sleeve $b$ to run inward in the head $a$, carrying the cap $i$ and shaft $f$ with it, and hence increasing the friction between the clutch members 16 and the pulley automatically, as may be required to take up the load. To unclutch the pulley, the rotation of the hand-wheel is manually retarded, and the hand-wheel is drawn outward, causing the stud or pin $o$ thereof to enter the long arm of the bayonet-slot in the cap $i$, and as the latter is in rotation at a higher speed than the retarded hand-wheel said pin $o$ is overtaken by the inner end of said slot, and the jar consequent upon the impact retards the rotation of the sleeve $b$, thereby causing the same to run outwardly, and hence withdraw the wedge 17.

Having thus described my invention, I claim—

1. The combination with a clutch having a revoluble element and radially-movable friction elements, of a wedge to operate said friction elements, a longitudinally-movable sleeve carried by said revoluble element and screwed thereto, a longitudinally-movable shaft in said sleeve and to which said wedge is attached, the latter being operated by said shaft, a cap on said sleeve and bearing on the outer end of said shaft, coacting cams to move said cap longitudinally on said sleeve and means to rotate said cap, substantially as described.

2. The combination with a clutch having a revoluble element and radially-movable friction elements of a longitudinally-movable sleeve screwed to and revoluble with said revoluble element, an endwise-movable shaft in said sleeve and movable outwardly thereby, a wedge carried on said shaft, said wedge engaging and operating said radially-movable friction elements, and a cap on said tubular sleeve, said cap having means for rotating it manually and engaging said endwise-movable shaft, coacting cams on said tubular shaft and a cap to move the latter longitudinally when partly rotated, and a centrifugal element revoluble with said cap and having lost motion thereon, substantially as described.

In testimony that I claim the foregoing as my own I have hereto affixed my signature in the presence of two witnesses.

HERMAN MOON.

Witnesses:
C. F. LAWRENCE,
E. B. LAWRENCE.